J. S. LASH.
BRUSH AND BROOM SUPPORTS.
No. 194,446. Patented Aug. 21, 1877.
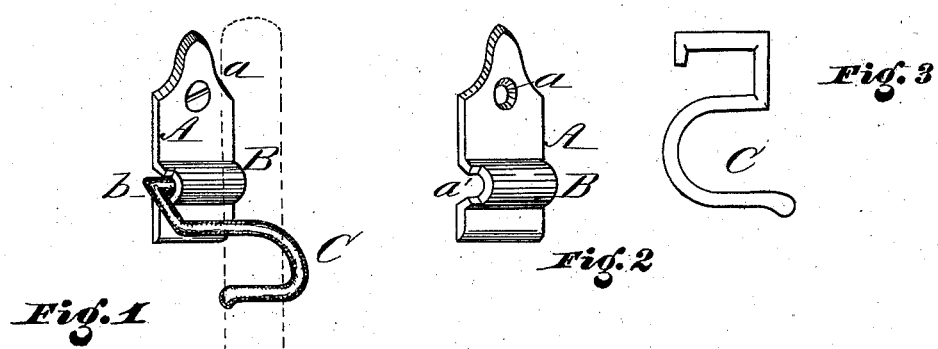

UNITED STATES PATENT OFFICE.

JOHN S. LASH, OF PHILADELPHIA, PENNSYLVANIA.

IMPROVEMENT IN BRUSH AND BROOM SUPPORTS.

Specification forming part of Letters Patent No. 194,446, dated August 21, 1877; application filed June 11, 1877.

*To all whom it may concern:*

Be it known that I, JOHN S. LASH, of Philadelphia, in the county of Philadelphia and State of Pennsylvania, have invented certain new and useful Improvements in Broom-Holders; and I do hereby declare the following to be a full, clear, and exact description of the invention, such as will enable others skilled in the art to which it pertains to make and use it, reference being had to the accompanying drawings, which form part of this specification, in which—

Figure 1 is a perspective view of my improvement with open holder. Fig. 2 is a perspective view of bracket for same. Fig. 3 is a perspective view of open holder.

This invention has relation to broom-holders for sustaining brooms by their handles on or against a wall, and consists in the construction of a device for this purpose, comprising a cast-metal bracket, and a pivoted hook or holder, which will receive the broom-handle, but will prevent it from slipping through, said device being specifically as hereinafter described and claimed.

Referring to the drawings, A designates a cast-metal plate or bracket, having holes $a$ for the passage of screws to secure it to a wall or door.

B is a semi-cylindrical bearing formed on said plate for the reception of the shank $b$ of the clamp or holder C. This holder is preferably made hook-shaped, as shown in Figs. 1 and 3, so that the broom-handle may be slipped in and out sidewise.

A notch, $a'$, is formed in one or both sides of the bearing B to receive the arm or arms of the holder, and serve as a stop to limit its play.

When the holder is of the open form shown in Figs. 1 and 3, only one notch is required.

The holder is fitted to the bracket before the latter is secured to the wall. The holder then hangs as in Fig. 1. The broom-handle may then be inserted.

The upper edge of the notch prevents the holder from being lifted too far by the pressure of the handle, while, when the broom is in place, its weight draws down the holder, which comes to an angle and binds the handle so as to support it. The lower edge of the notch prevents the holder from falling too far, and allows the broom to hang out from the wall, so as not to soil or otherwise injure it.

What I claim as my invention is—

1. The hook-shaped holder C, having the shank $b$, in combination with the bracket A, having the notched bearing $a'$, substantially as shown and described.

2. The broom-holder bracket, consisting of the plate A, having the semi-cylindrical bearing B notched at $a'$, as shown and described, and for the purpose set forth.

In testimony that I claim the foregoing I have hereunto set my hand this 4th day of June, 1877.

JOHN S. LASH.

Witnesses:
T. A. CONNOLLY,
CHAS. F. VAN HORN.